United States Patent [19]

Lynch et al.

[11] 4,272,338
[45] Jun. 9, 1981

[54] PROCESS FOR THE TREATMENT OF ANOLYTE BRINE

[75] Inventors: Richard W. Lynch, Chattanooga; Garland E. Hilliard; Ronald L. Dotson, both of Cleveland, all of Tenn.

[73] Assignee: Olin Corporation, New Haven, Conn.

[21] Appl. No.: 46,403

[22] Filed: Jun. 6, 1979

[51] Int. Cl.³ .................................................. C25B 1/46
[52] U.S. Cl. .................................. 204/98; 204/128
[58] Field of Search .................. 423/579, 481; 204/98, 204/128

[56] References Cited

U.S. PATENT DOCUMENTS

| 3,438,879 | 4/1969 | Kircher et al. | 204/98 |
|---|---|---|---|
| 4,025,405 | 5/1977 | Dotson et al. | 204/98 |
| 4,040,919 | 8/1977 | Eng | 204/128 |
| 4,073,706 | 2/1978 | Nagy | 204/98 |
| 4,078,978 | 3/1978 | Zirngiebl | 204/98 |
| 4,116,781 | 9/1978 | Dorio et al. | 204/98 |

OTHER PUBLICATIONS $H_2O_2$ by Schumb et al., p. 398, Reinhold Pub. Corp. 1955.
Advanced Inor. Chem. by F. A. Cotton et al., pp. 280-284, Interscience Publishers, 1962.

Primary Examiner—R. L. Andrews
Attorney, Agent, or Firm—Donald F. Clements; James B. Haglind

[57] ABSTRACT

A process for removing dissolved halogen gas and oxyhalide ions from an aqueous alkali metal halide solution containing them which comprises reacting said aqueous alkali metal halide solution with an inorganic peroxide, and adjusting the pH of said aqueous alkali metal halide solution to a pH within the range from about 6 to about 11 with an inorganic base, whereby a purified alkali metal halide solution of reduced concentration of said dissolved halogen gas and oxyhalide ions is produced.

28 Claims, 1 Drawing Figure

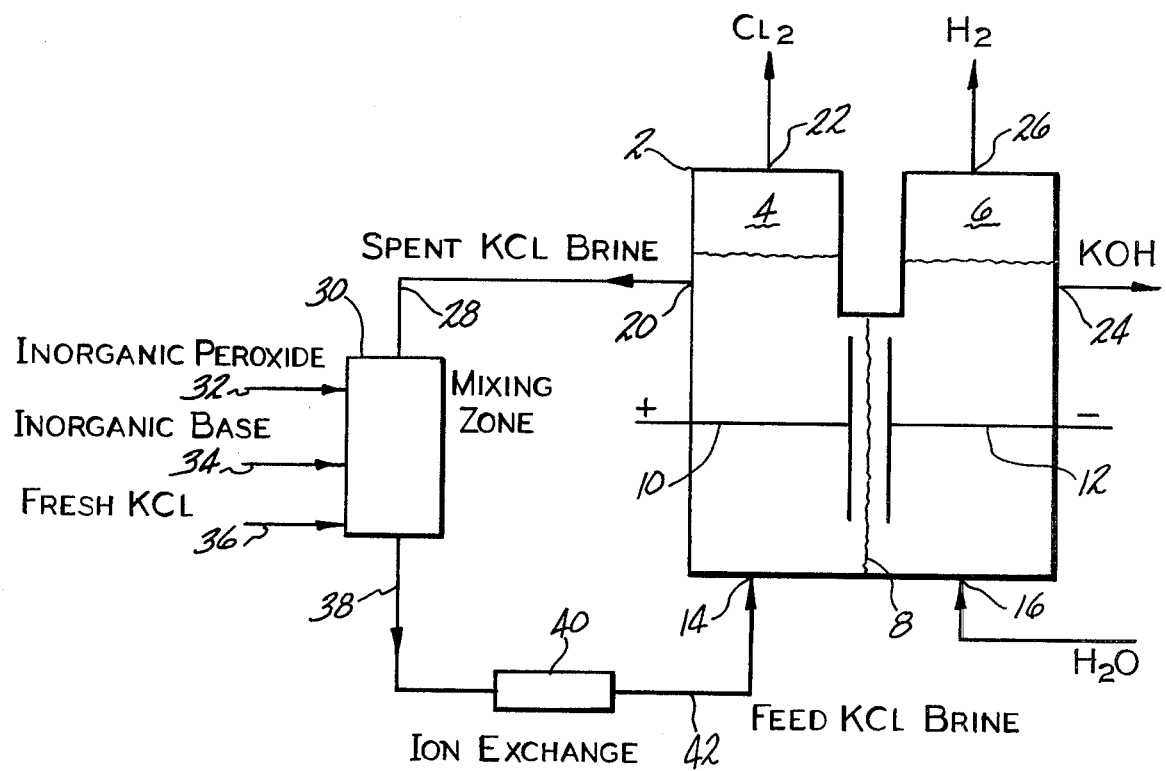

PROCESS FOR THE TREATMENT OF ANOLYTE BRINE

This invention relates to a process for the removal of dissolved halogen gas and oxyhalide ions from spent anolyte brine in an electrolytic cell. More specifically, this invention relates to the removal of dissolved chlorine gas and hypochlorite ions from spent KCl brine employed in the electrolytic production of aqueous solutions of potassium hydroxide. This invention also relates to the removal of dissolved chlorine gas and hypochlorite ions from spent NaCl brine employed in the electrolytic production of aqueous solutions of sodium hydroxide.

Potassium hydroxide is used in the manufacture of soft soap, alkaline batteries, and in the production of textiles and the fabrication of rubber.

Commerically, potassium hydroxide is produced in electrolytic cells employing asbestos diaphragms, as a product liquor containing 10–15 percent KOH and about 10 percent KCl. The liquor is concentrated by evaporation while crystallizing out KCl to provide a concentrated solution containing about 45 percent KOH and containing about 1 percent KCl.

Recently, polymeric materials having ion exchange properties have been produced which may be employed as membranes in electrolytic cells. During the electrolysis of alkali metal chlorides, alkali metal hydroxides having increased concentration and reduced alkali metal chloride content can be obtained with membranes of these polymeric materials.

U.S. Pat. No. 3,773,634, issued to A. J. Stacey and R. L. Dotson on Nov. 20, 1973, describes a process for electrolyzing aqueous sodium chloride having a concentration in the range of 120–250 grams per liter in the anolyte to produce sodium hydroxide where the concentration is held in the range of 31–43 percent.

U.S. Pat. No. 4,062,743, issued to Byung K. Ahn and Ronald L. Dotson on Dec. 13, 1977, discloses an electrolytic process for improving the current efficiency in a membrane cell for the production of KOH from aqueous solutions of potassium chloride.

Both cells described above typically employ hydraulically impervious cation-permselective membranes such as the perfluorosulfonic acid membranes.

During electrolysis of the KCl brine, about 10 to about 30 percent of the KCl in the feed brine, usually a saturated aqueous solution of KCl brine, is utilized in electrolysis. The spent KCl brine from the anolyte chamber is typically recycle and reconstituted by adding makeup KCl rather than discarded.

Generally, the makeup KCl solid contains small yet important amounts of calcium compounds which have a detrimental effect on the permselective membrane employed in the electrolysis cell. Typically, ion exchange resin is employed to effectively remove calcium from the feed KCl brine solution.

Additionally, a small amount of dissolved chlorine formed in the anolyte chamber during the electrolysis of KCl remains in the spent KCl brine solution typically in the form of oxyhalide ion such as hypochlorite ion or a dissolved halogen such as $Cl_2$.

The presence of even small amounts of dissolved halogen gas such as dissolved chlorine and oxyhalide ions such as hypochlorite ions have a detrimental effect on the ion exchange resins employed to remove calcium ions from the feed KCl brine solution.

Both dissolved chlorine and calcium must be effectively removed from the reconstituted KCl brine prior to electrolysis.

To reconstitute the spent KCl brine and to remove dissolved halogen gas and oxyhalide ion, typically additional makeup KCl is first added to the spent KCl brine to form reconstituted brine. The pH of the reconstituted KCl brine is adjusted to a value in the range from about 2 to about 4 by the addition of acid. The reconstituted KCl brine is heating from the cell operating temperature in the range from about 30° to about 90° C. to a temperature of about 105° C. to remove chlorine. A vacuum step is employed to further remove $Cl_2$ and the pH is adjusted to about 7 prior to contacting the reconstituted KCl brine with an ion exchange resin to remove calcium. The reconstituted KCl brine is fed to the electrolyte cell for electrolysis.

There is a remaining need for an improved method for removing dissolved halogen gas and oxyhalide ions from aqueous solutions of alkali metal halide solutions containing them which avoids the use of strong acid and copious amounts of energy in heating of the spent brine solution.

OBJECTS

It is a primary object of this invention to provide an improved process for the treatment and regeneration anolyte brines employed in the electrolytic production of alkali metal hydroxides.

It is an additional object of this invention to provide an improved process for the removal of dissolved chlorine and oxyhalide ion from spent KCl brine employed in the electrolytic production of potassium hydroxide.

These and other objects of the invention will be apparent from the following detailed description and the appended claims.

BRIEF DESCRIPTION OF THE INVENTION

The foregoing objects of the invention are accomplished in a process for removing dissolved halogen gas and oxyhalide ions from an aqueous alkali metal halide solution containing them which comprises:

(a) reacting said aqueous alkali metal halide solution with an inorganic peroxide, and (b) adjusting the pH of said aqueous alkali metal halide solution to a pH within the range from about 6 to about 11 with an inorganic base, whereby, a purified alkali metal halide solution of reduced concentration of said dissolved halogen gas and oxyhalide ions is produced.

The accompanying FIGURE represents a schematic view of an electrolytic membrane cell used for employing the process of the present invention.

DETAILED DESCRIPTION OF THE INVENTION

For simplicity, the process of this invention is described with respect to a potassium chloride brine. However, the process of this invention is equally applicable for other alkali metal halides such as sodium chloride, solium bromide, potassium bromide or mixtures thereof.

Membrane cell 2 is divided into an anolyte chamber 4 and a catholyte chamber 6 by cationic permselective membrane 8. Anode 10 is located in anolyte chamber 4 and cathode 12 is positioned in catholyte chamber 6. A potassium chloride brine is fed through inlet 14 into anolyte chamber 4. Water is fed to catholyte chamber 6 of membrane cell 2 through inlet 16.

An electric current is applied to anode 10 to electrolytically decompose the potassium chloride brine into chloride ions, which forms chlorine gas at the anode 10, the potassium ions which form in anolyte chamber 4.

Cationic permselective membrane 8 permits potassium ions and a small amount of water to pass from anolyte chamber 4 through to catholyte chamber 6 while preventing the passage of chloride ions or chlorine gas bubbles. To maintain high anolyte current efficiency, spent potassium chloride brine is continuously removed from anolyte chamber 4 through outlet 20. Chlorine gas is removed from anolyte chamber 4 through outlet 22. An aqueous solution of product potassium hydroxide is obtained through outlet 24 in catholyte chamber 6. Gaseous hydrogen is removed from catholyte chamber 6 through outlet 26. Spent potassium chloride brine is removed from anolyte chamber 4 of membrane cell 2 through outlet 20 and transferred in process line 28 to reaction zone 30. Process connections 32, 34, and 36 to mixing zone 30 provide for the addition of inorganic peroxide, an inorganic base and fresh KCl or KCl brine to the spent potassium chloride brine. Fresh potassium chloride is added to the spent potassium chloride brine in mixing zone 30 to form a potassium chloride brine of increased potassium chloride concentration hereafter referred to as reconstituted potassium chloride brine.

Reconstituted potassium chloride brine is transferred from mixing zone 30 through process line 38 to ion exchange unit 40 and is conveyed from ion exchange unit 40 through process line 42 in inlet 14 in the bottom of anolyte chamber 4.

The cationic permselective membrane 8 which separates the anolyte chamber 4 from the catholyte chamber 6 is comprised of a solid fluorocarbon polymer reinforced by a screen of a suitable metal or a fabric such as a polyfluoroolefin cloth, rayon, or mixtures thereof.

Materials suitable for use as membranes in the process of this invention include the sulfonic acid substituted perfluorocarbon polymers of the type described in U.S. Pat. No. 4,036,714, which issued on July 19, 1977, to Robert Spitzer; the primary amine substituted polymers described in U.S. Pat. No. 4,085,071, which issued on Apr. 18, 1978 to Paul Raphael Resnick et al; the polyamine and diamine substituted polymers of the type described in U.S. Pat. No. 4,030,988, which issued on June 21, 1977 to Walther Gastav Grot; and the carboxylic acid substituted polymers described in U.S. Pat. No. 4,065,366, which issued on Dec. 27, 1977 to Yoshio Oda et al. All of the teachings of these patents are incorporated herein in their entirety by reference.

With respect to the sulfonic acid substituted polymers of U.S. Pat. No. 4,036,714, these membranes are preferably prepared by copolymerizing a vinyl ether having the formula $FSO_2CF_2CF_2OCF(CF_3)CF_2OCF=CF_2$ and tetrafluoroethylene followed by converting the $-SO_2F$ group to either $-SO_3H$ or sulfonate (for example, alkali metal sulfonates) or both. The equivalent weight of the preferred copolymers range from 950 to 1600 where equivalent weight is defined as the average molecule weight per sulfonyl group.

With reference to the primary amine substituted polymers of U.S. Pat. No. 4,085,071, the basic sulfonyl fluoride polymer of the U.S. Pat. No. 4,036,714 above is first prepared and then reacted with a suitable primary amine wherein the pendant sulfonyl fluoride groups react to form N-monosubstituted sulfonamido groups or salts thereof. In preparing the polymer precursor, the preferred copolymers utilized in the film are fluoropolymers or polyfluorocarbons although others can be utilized as long as there is a fluorine atom attached to the carbon atom which is attached to the sulfonyl group of the polymer. The most preferred copolymer is a copolymer of tetrafluoroethylene and perfluoro (3,6-dioxa-4-methyl-7-octenesulfonyl fluoride) which comprises in the range of about 10 to about 60 and preferably about 25 to about 50 percent by weight of the latter. The sulfonyl groups are then converted to N-monosubstituted sulfonamido groups of salts thereof through the reaction of a primary amine.

Polymers similar to the above U.S. Pat. No. 4,085,071 are prepared as described in U.S. Pat. No. 4,030,988, wherein the backbone sulfonated fluoride polymers are reacted with a di- or polyamine, such as ethylene diamine, with heat treatment of the converted polymer to form diamino and polyamino substituents on the sulfonyl fluoride sites of the copolymer.

The carboxylic acid substitued polymers of U.S. Pat. No. 4,065,366 are prepared by reacting a fluorinated olefin with a comonomer having a carboxylic acid group or a functional group which can be converted to a carboxylic acid group. It is preferred to use a fluorinated copolymer having a molecular weight to give the volumetric melt flow rate of 100 millimeters per second at a temperature of 250° to 300° C. Preferably, the membrane is prepared by copolymerizing tetrafluoroethylene with $CF_2=CFO(CF_2)_3COOCH_3$.

The thickness of the membrane may be in the range from about 3 to about 20 mils, and preferably from about 5 to about 10 mils. For selected membranes a laminated inert cloth supporting material for the membrane of polytetrafluoroethylene may be used.

Although the aforesaid membranes appear to provide the highest overall efficiency of the operation of the process of this invention, one will recognize that any inert hydrophilic membrane material that is capable of effecting the electrolytic production of alkali metal hydroxide from a brine containing alkali metal halides such as sodium chloride, potassium chloride, or mixtures thereof, may be used.

Any suitable electrodes may be used as the anode or cathode in the electrolytic membrane cell. Typical anodes are those of graphite or a foraminous metal such as titanium or tantalum having an electroactive coating over at least a portion of the anode surface. Suitable coatings include those of a platinum group metal, platinum group metal oxide, an alloy of a platinum group metal or mixtures thereof. The term "platinum group metal" means an element of the group consisting of ruthenium, rhodium, platinum, palladium, osmium, and iridium.

Also effective are anodes composed of graphite, or anodes comprised of a metal oxide coated substrate such as described in U.S. Pat. No. 3,632,498, issued to H. B. Beer on Jan. 4, 1972. When such electrodes are employed as anodes, anodic chlorine overvoltage is minimized. Any electrode construction capable of effecting electrolytic production of alkali metal hydroxide such as sodium hydroxide, potassium hydroxide or mixtures thereof, from a brine containing alkali metal halides such as sodium chloride, potassium chloride, or mixtures thereof, may be employed in the process of this invention.

Examples of materials which may be employed as the cathode are carbon steel, stainless steel, nickel, nickel molybdenum alloys, nickel vanadium alloys and others. Any cathode material that is capable of effecting the electrolytic reduction of water with either high or low hydrogen overvoltage may be used as cathode construction material in the process of this invention.

The cathode and anode may each be of either solid, felt, mesh, foraminous, packed bed, expanded metal, or other design. Any electrode configuration capable of effecting catholyte electrolytic production of $Cl_2$ from KCl or cathodic production of KOH may be used as anodes or cathodes respectively in the process of this invention.

The potassium chloride brine used as cell feed is producing potassium hydroxide in a concentrated aqueous solution containing from about 250 to about 700 and preferably from about 270 to about 300 grams KCl per liter.

The potassium chloride brine removed from the anolyte chamber after electrolysis is known as spent potassium chloride brine. Typically the concentration of potassium chloride is increased therein by the addition of fresh potassium chloride to form a reconstituted brine.

An aqueous solution of potassium hydroxide is produced in the catholyte chamber. The concentration of the solution is maintained at from about 250 to about 700, preferably at from about 300 to about 650, and more preferably at from about 450 to about 600 grams per liter of KOH. To initially obtain this concentration, the cell may be operated until the desired concentration is reached or alternately an aqueous solution of potassium hydroxide or sodium hydroxide of the desired concentration may be introduced into the catholyte chamber before starting the electrolysis. In a preferred embodiment, the KOH concentration is maintained within the desired range by introducing water into the catholyte chamber at a rate of about 0.05 to about 0.15 milliliter per minute per kiloampere per square meter of cathode surface. The amount of water added is related to controlling the concentration of the potassium hydroxide in the catholyte, which, in turn, determines the ion transport properties of the membrane.

The potassium hydroxide produced in the catholyte chamber is a highly pure product containing only minor amounts of potassium chloride as an impurity (less than 1.2 grams per liter). The minor amounts of potassium chloride migrate from the anolyte chamber to the catholyte chamber through the cation permselective membrane.

Chlorine gas produced in the anolyte chamber and hydrogen gas produced in the catholyte chamber are recovered by methods well known in the prior art.

As shown in the FIGURE, the spent potassium chloride brine solution is removed from the anolyte chamber of the cell after partial depletion by electrolysis.

The spent potassium chloride brine solution contains oxyhalide ions such as hypochlorite ions which are produced in small amounts in the anolyte chamber of the electrolytic cell during electrolysis.

The spent potassium chloride brine solution typically contains hypochlorite ion, $OCl^-$, at a concentration in the range from about 0.2 to about 0.8 grams per liter as chlorine.

The spent potassium chloride brine solution also contains dissolved chlorine, $Cl_2$, at a concentration in the range from about 0.2 to about 0.8 grams per liter as chlorine.

Those of skill in the art will recognize that lesser or greater amounts of hypochlorite ion and dissolved chlorine may be contained in the spent potassium chloride solution.

An inorganic peroxide, generally in the form of an aqueous solution, is admixed with spent potassium chloride brine solution to reduce the concentration of dissolved chlorine gas and hypochlorite ions in the brine.

Typical inorganic peroxides which may be employed in the process of this invention include hydrogen peroxide, $O_3$, alkali metal peroxides such as potassium peroxide, $K_2O_2$, sodium peroxide, $Na_2O_2$, alkali metal superoxides such as potassium superoxide, $KO_2$, sodium superoxide $NaO_2$, and mixtures thereof. However, $H_2O_2$ is preferably employed as the inorganic peroxide reactant.

Without being bound by theory, it is believed that the inorganic peroxide reacts with the dissolved halide such as oxyhalide ion to produce oxygen, an oxygen-containing compound corresponding to the inorganic peroxide employed and a halide ion corresponding to the oxyhalide ion present in the aqueous solution. For example, it is believed that $H_2O_2$ reacts with hypochlorite ion to produce oxygen, water and chloride ion according to equation (1):

$$H_2O_2 + OCl^- \rightarrow O_2 + H_2O + Cl^- \qquad (1)$$

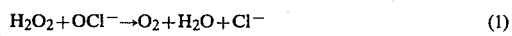

Without being bound by theory, it is believed that the inorganic peroxide reacts with the dissolved gas to produce oxygen and a halide compound corresponding to the dissolved halogen gas present in the aqueous solution. For example, it is believed that hydrogen peroxide, $H_2O_2$, reacts with dissolved halogen gas such as $Cl_2$, to produce oxygen and HCl according to equation (2):

$$H_2O_2 + Cl_2 \rightarrow O_2 + 2HCl \qquad (2)$$

The molar ratio of inorganic peroxide added to the total moles of dissolved hypochlorite ion and dissolved chlorine present in the spent potassium chloride brine solution is in the range from about 0.5:1 to about 1.2:1 and preferably from about 0.9:1 to about 1.05:1.

The reactions illustrated in equation (1) and (2) proceed essentially to completion. The total amount of hypochlorite ion and dissolved halogen remaining unreacted is in the range from about 0.2 to about 0.8 as grams chlorine per liter. Those of skill in the art will recognize that greater or lesser amounts of hypochlorite ion and dissolved chlorine may remain unreacted in the spent potassium chloride solution.

The initial pH of the spent potassium chloride brine solution from the anolyte chamber of the electrolytic cell is in the range from about 3 to about 5. A base, such as an alkali metal hydroxide, for example KOH, is added to the spent potassium chloride brine solution to increase the initial pH to a final pH in the range from about 5 to about 11 and preferably from about 6 to about 8.

Although not required, it is preferred to employ an alkali metal base corresponding to the alkali metal chloride being electrolyzed. For example, when electrolyzing potassium chloride brine, it is preferred to employ KOH as a base to adjust the pH of the spent potassium chloride brine solution.

The temperature of the process is in the range from about 0° to about 90° and preferably from about 15° to about 80° C.

The pressure of the process may be sub- or superatmospheric but is preferably about atmospheric.

Completion of the reaction of the alkali metal halide solution with the inorganic peroxide and adjustment of the pH of the solution to a final pH as described above results in the production of a purified alkali metal halide solution of reduced concentration of dissolved halogen gas and oxyhalide ions.

In a brine reconstitution step, fresh alkali metal chloride is admixed with the purified alkali metal halide solution. For example, commercially available alkali metal chloride solid used in alkali metal chloride brine preparation is added to the purified alkali metal halide solution to increase the concentration of alkali metal chloride brine thereby forming a reconstituted brine.

Typically, the commercially available alkali metal chloride such as KCl solid contains at least about 98 percent by weight potassium chloride with the remainder less than about 2 percent by weight NaCl and other impurities.

Smaller amounts of calcium are also present in commercially available alkali metal chloride solid, typically, at a concentration in the range from about 0.2 to about 100 parts per million by weight. Those of skill in the art will recognize that greater or less amounts of calcium may be present in alkali metal solid.

The amount of alkali metal chloride and water which are added to the purified alkali metal halide solution is dependent upon the desired final concentration of chloride brine fed to the anolyte chamber of the electrolytic cell.

Generally, to achieve optimum operation of the electrolytic cell, the desired final concentration of chloride brine will be the saturation value corresponding to that brine. For example, the saturation value for KCl is about 300 grams KCl per liter of solution at normal room temperature.

To ensure complete reaction of the hypochlorite ion, a small amount of a reducing agent such as potassium thiosulfate, $K_2S_2O_3$, is added to the spent chloride brine solution. Without being bound by theory, it is believed that the potassium thiosulfate chemically decomposes unreacted oxyhalide ion such as hypochlorite ion or unreacted peroxide.

While the previously described order of addition of inorganic peroxide, inorganic base and fresh potassium chloride for brine reconstitution to the spent brine solution is the preferred order, it is recognized that any suitable order of addition may be employed.

After addition of the fresh potassium chloride, the concentration of calcium ion therein is in the range from about 0 to about 50 parts per million by weight.

If desired, an alkali metal carbonate such as potassium carbonate may be added to precipitate calcium carbonate which is thereafter removed from the reconstituted brine by filtration.

The reconstituted brine is then contacted with ion exchange resin; for example, a chelating resin having a high selectivity for selected metal ions such as calcium, to effectively remove the calcium from the reconstituted brine. An example of a preferred chelating resin is a styrene divinyl benzene copolymer having iminodiacetate groups.

The reconstituted chloride brine may be recycled to the anolyte chamber of the electrolytic cell after reconstitution with solid KCl or fresh potassium chloride brine along with fresh chloride brine solution, if desired, to prepare hydrogen gas, chlorine gas and aqueous solutions of KOH during electrolysis.

The following examples are presented to define the invention more fully without any intention of being limited thereby. All parts and percentages are by weight unless indicated otherwise.

EXAMPLE

In this Example, the dissolved $Cl_2$ gas and hypochlorite ions in a spent KCl brine from an electrolytic cell employed to prepare an aqueous solution of KOH, $H_2$ gas, and $Cl_2$ gas, were removed and a purified KCl brine solution of reduced concentration of $Cl_2$ gas and hypochlorite ion was produced.

A divided electrolytic cell, similar to the FIGURE, having an anolyte chamber containing an anode and a catholyte chamber containing a cathode and a permselective membrane as a separator there between was employed in this Example.

The permselective membrane was a homogeneous film of cationic exchange membrane about 7 mils thick comprised of about 1150 equivalent weight perfluorosulfonic acid resin chemically modified on one side by ethylene diamine, converted to a depth of about 1.5 mils to perfluorosulfonamide. The other side was laminated to a fabric backing of polytetratfluorethylene resin.

A glass storage flask and circulation pump was positioned adjacent to and connected to the anolyte chamber so that during electrolysis the anolyte solution was continuously supplied at a controlled rate to to the anolyte chamber of the electrolytic cell. Similarly, a glass storage flask was connected to the outlet process connection on the anolyte chamber to collect depleted potassium chloride brine for treatment and regeneration and subsequent recycle as feed potassium chloride to the electrolytic cell. In addition, a glass storage flask was connected to the outlet process connection on the catholyte chamber to collect product potassium hydroxide. A source of deionized water was connected to a process inlet of the catholyte chamber. The vapor outlet of the catholyte chamber was connected to a vent scrubber to handle chlorine generated in the anolyte chamber of the cell. Hydrogen generated in the anolyte chamber was collected in a process hydrogen header system.

After the cell was assembled, concentrated potassium chloride brine containing about 280 grams potassium chloride per liter of solution was added to the anolyte storage flask. Anolyte circulation was started from the anolyte storage flask through the anolyte chamber into an outlet anolyte storage flask.

For startup purposes only, the catholyte chamber was filled with an aqueous solution of sodium hydroxide containing about 30 percent sodium hydroxide by weight.

After electrolysis was started in the cell and after the concentration of KOH in the catholyte chamber was about 400 grams KOH per liter of solution, deionized water was supplied to the catholyte chamber at about 0.35 millimeter per minute. The portion of the catholyte containing the startup sodium hydroxide was collected in a separate vessel apart from product KOH.

Spent potassium chloride brine solution having a concentration of about 258 grams potassium chloride per liter of solution and about 54 grams dissolved hypochlorite and dissolved $Cl_2$ total which corresponds to about 0.74 grams per liter of solution was continuously removed from the anolyte chamber and collected in several glass storage flasks.

As each storage flask was filled with spent brine solution, the solution therein was treated according to the process of this invention as described hereafter.

About 80 grams of an aqueous solution containing about 28 grams of $H_2O_2$ was admixed with about 73,250 grams of the spent brine solution which was maintained at a temperature of about 30° C.

The resulting solution was mixed for about 5 minutes.

After addition of the hydrogen peroxide solution in this manner, analysis of the spent brine showed the concentration of hypochlorite ion and dissolved chlorine in the resulting solution to be essentially zero, indicating a complete reaction between the hydrogen peroxide and the hypochlorite and dissolved $Cl_2$.

The initial pH of the spent brine solution from the anolyte chamber of the cell was determined to be about 4.1.

About 2550 grams potassium chloride containing about 15 parts per million calcium by weight was added to the spent KCl brine solution to form a reconstituted brine solution having a concentration of about 290 grams KCl per liter. The pH of the reconstituted potassium chloride solution was adjusted to about 7.9 by addition of about 20 grams of 42 weight percent potassium hydroxide solution.

The concentration of calcium in the resulting reconstituted brine solution was determined to be about 5 parts calcium per million by weight.

The reconstituted stream was then contacted with an ion exchange resin compound of a styrene-divinyl benzene copolymer containing iminodiacetate groups produced by Mitsubishi Chemical and sold at DIAION® CR-10 chelating resin, to effectively remove calcium from the stream. The concentration of calcium in the reconstituted brine stream exiting from the ion exchange step was about 0.2 parts calcium per million by weight.

Thereupon, as necessary, each succeeding quantity of spent KCl brine recovered from the anolyte chamber of the electrolytic cell was treated to remove dissolved $Cl_2$ gas and hypochlorite ion. Thereafter, the spent potassium chloride brine was reconstituted and fed to the anolyte chamber of the electrolytic cell as described above.

What is claimed is:

1. A process for removing dissolved halogen gas and oxyhalide ions from a spent alkali metal halide brine containing them which comprises circulating said spent brine to a treatment zone outside an electrolysis cell and:
   (a) reacting said aqueous alkali metal halide brine with an inorganic peroxide, and
   (b) adjusting the pH of said aqueous alkali metal halide brine to a pH within the range from about 5 to about 11 with an inorganic base,
whereby a purified alkali metal halide solution of reduced concentration of said dissolved halogen gas and oxyhalide ions is produced; and circulating said purified solution back to the cell.

2. The process of claim 1, wherein the molar ratio of said inorganic peroxide to said dissolved halogen gas and oxyhalide ions is in the range from about 0.5:1 to about 1.2:1.

3. The process of claim 1, wherein the molar ratio of said inorganic peroxide to said dissolved halogen gas and oxyhalide ions is in the range from about 0.9:1 to about 1.05:1.

4. The process of claim 3, wherein said spent alkali metal halide brine is adjusted to a pH within the range from about 6 to about 8 with an inorganic base.

5. The process of claim 4, wherein said inorganic base is an alkali metal hydroxide.

6. The process of claim 5, wherein the temperature of said process is in the range from about 0° to about 90° C.

7. The process of claim 6, wherein the temperature of said process is in the range from about 15° to about 80° C.

8. The process of claim 7, wherein said spent alkali metal brine is an alkali metal chloride brine, said halogen gas is chlorine, and said oxyhalide ion is hypochlorite ion.

9. The process of claim 7, wherein said alkali metal brine is an alkali metal bromide brine, said halogen gas is bromine, and said oxyhalide ion is hypobromite ion.

10. The process of claim 8, wherein said spent alkali metal chloride brine is sodium chloride brine.

11. The process of claim 8, wherein said alkali metal chloride brine is potassium chloride brine.

12. The process of claim 10 or 11, wherein said inorganic peroxide is selected from a group consisting of hydrogen peroxide, sodium peroxide, potassium peroxide, potassium superoxide, sodium superoxide, and mixtures thereof.

13. The process of claim 12, wherein said inorganic peroxide is hydrogen peroxide.

14. The process of claim 13, wherein said alkali metal hydroxide is selected from a group consisting of sodium hydroxide, potassium hydroxide or mixtures thereof.

15. The process of claim 14, wherein said alkali metal hydroxide is potassium hydroxide.

16. The process of claim 15, wherein additional alkali metal halide containing calcium ion is admixed with said purified alkali metal halide solution to increase the concentration of said alkali metal halide therein, thereby producing a reconstituted alkali metal halide brine.

17. The process of claim 16, wherein a reducing agent is added to said reconstituted alkali metal halide brine solution to ensure complete reaction of said oxyhalide ions and said inorganic peroxide to produce a purified reconstituted alkali metal halide brine.

18. The process of claim 17, wherein said reducing agent is potassium thiosulfate.

19. The process of claim 16, 17 or 18, wherein an alkali metal carbonate is added to said reconstituted alkali metal halide brine to form a calcium carbonate precipitate and removing said precipitate from the resulting purified reconstituted alkali metal halide brine.

20. The process of claim 16, wherein said reconstituted alkali metal halide brine is contacted with an ion exchange resin, whereby said calcium ion is effectively removed to produce a purified reconstituted alkali metal halide brine.

21. The process of claim 20, wherein said ion exchange resin is a styrene divinyl benzene copolymer having iminodiacetate groups.

22. The process of claims 20 or 21, wherein said purified reconstituted alkali metal halide brine is fed to an electrolytic cell for electrolysis.

23. The process of claim 22, wherein said electrolytic cell is a divided electrolytic cell having an anolyte chamber containing an anode and a catholyte chamber containing a cathode and employing a separator therebetween.

24. The process of claim 23, wherein said separator is a permselective membrane.

25. The process of claim 24, wherein said permselective membrane is a carboxylic acid substituted membrane.

26. The process of claim 24, wherein said permselective membrane is a sulfonic acid substituted perfluorocarbon membrane.

27. The process of claims 20 or 24, wherein said alkali metal halide is potassium chloride and the concentration of potassium chloride in said reconstituted alkali metal halide brine is in the range from about 250 to about 700 grams potassium chloride per liter.

28. The process of claim 27, wherein the concentration of potassium chloride in said reconstituted brine is in the range from about 270 to about 300 grams potassium chloride per liter.

* * * * *